Figure 1:
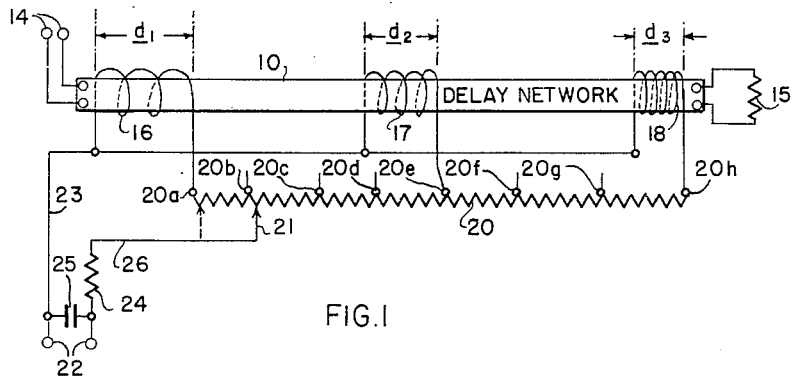

Feb. 6, 1951          H. A. WHEELER          2,540,560

PULSE SIGNAL TIME DELAY ARRANGEMENT

Filed April 11, 1947          2 Sheets—Sheet 1

*INVENTOR.*
HAROLD A. WHEELER

BY John A. Harvey

ATTORNEY

Feb. 6, 1951   H. A. WHEELER   2,540,560
PULSE SIGNAL TIME DELAY ARRANGEMENT
Filed April 11, 1947   2 Sheets-Sheet 2

INVENTOR.
HAROLD A. WHEELER
BY John A. Harvey
ATTORNEY

Patented Feb. 6, 1951

2,540,560

UNITED STATES PATENT OFFICE 2,540,560

PULSE SIGNAL TIME DELAY ARRANGEMENT

Harold A. Wheeler, Great Neck, N. Y., assignor to Hazeltine Research, Inc., Chicago, Ill., a corporation of Illinois Application April 11, 1947, Serial No. 740,823

10 Claims. (Cl. 178—44)

1

This invention is directed to time-delay arrangements for translating wave signals and is related to application Serial No. 740,822, now abandoned, filed concurrently herewith in the name of H. A. Wheeler. While the invention is subject to a variety of uses, it is particularly suited for inclusion in arrangements of the type disclosed in the aforementioned copending application, featuring a continuously or closely adjustable time delay and adapted to translate pulse signals having a short duration relative to the total time delay of the arrangement. For convenience of explanation, it will be disclosed in that environment.

Time-delay networks, as such, have long been known in the art and have taken the form of an unbalanced or a balanced circuit. Although the invention may be utilized with either type, it may be fully understood from a consideration of its application to an unbalanced arrangement. One prior construction of unbalanced network comprises a single distributed winding, insulated from but capacitively coupled along its length to a conductive member, such as a longitudinally slotted core structure positioned within the winding. The capacitance between the winding and its core structure supplies the distributed capacitance of the network which, together with the inductance of the winding, determines the total time delay. Input and output terminals are located at opposite ends of the winding so that applied signals are derived at the output terminals after some delay. Such prior structures are satisfactory for certain purposes but their use is limited by the fact that they provide an amount of delay which is fixed and not readily adjustable.

It has been proposed to modify the described unbalanced network to include a coupling device, such as an inductive coupling loop or capacitive coupling electrode, coupled to and freely slidable along the winding of the network to derive an output signal having a continuously variable time delay. The arrangement as thus modified presents a continuously adjustable time delay but has difficulties of construction, especially if the network is made in several separate units. Also, it is found that the wave form of the output signal varies materially with the position of the coupling device along the network. This is because the ordinary network exhibits both amplitude attenuation and pulse-slope deterioration for signals translated therethrough. Consequently, a signal obtained with the coupling device positioned for a small delay usually has a greater amplitude and shorter duration than a signal

2 derived by the same device when it is adjusted for a greater delay. It is usually desirable and sometimes essential that the signal output have substantially the same wave form irrespective of the amount of the delay introduced by the network.

It is an object of the present invention, therefore, to provide a time-delay signal-translating arrangement which avoids one or more of the aforementioned limitations of prior arrangements.

It is another object of the invention to provide a new and improved arrangement for translating pulse signals with a selectable time delay and with a wave form which is substantially independent of the delay in translation.

It is a specific object of the invention to provide a time-delay arrangement having a new and improved coupling device associated therewith for translating signals with a selectable time delay and with a wave form which is substantially independent of the selected delay.

An arrangement, in accordance with the invention, for translating pulse signals of a predetermined slope with a selectable time delay comprises a time-delay network exhibiting given amounts of attenuation and slope reduction per unit length to such pulses. A plurality of coupling devices is distributed along the network. These devices individually have one parameter, determining the amplitude of pulses translated thereby, proportioned relative to the distance of the coupling device from one end of the network, and have another parameter, determining the slope of such pulses, also proportioned relative to that distance so that the signal path from the one end of the network to every one of the devices causes approximately the same total attenuation and slope reduction to applied pulses.

For a better understanding of the present invention, together with other and further objects thereof, reference is had to the following description taken in connection with the accompanying drawings, and its scope will be pointed out in the appended claims.

Figure 2:
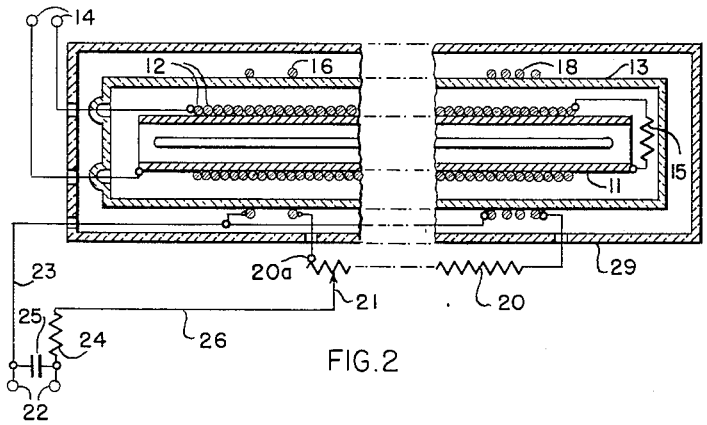
Figure 3:
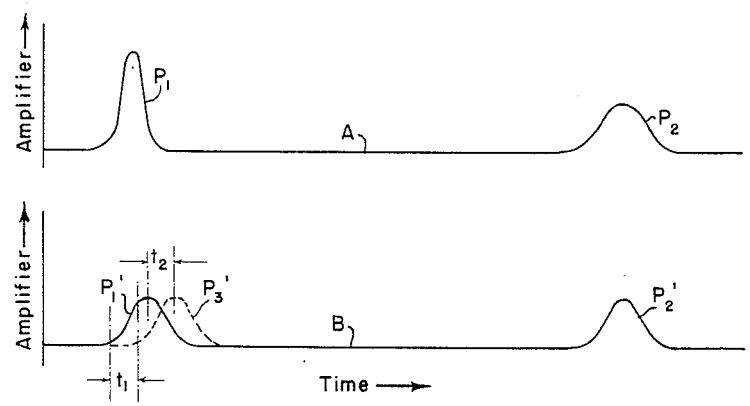
Figure 4:
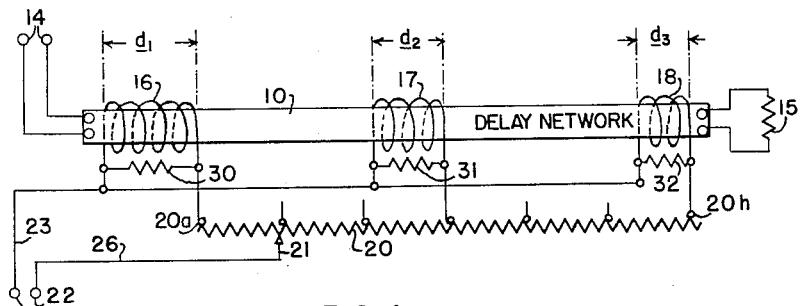
Figure 6:
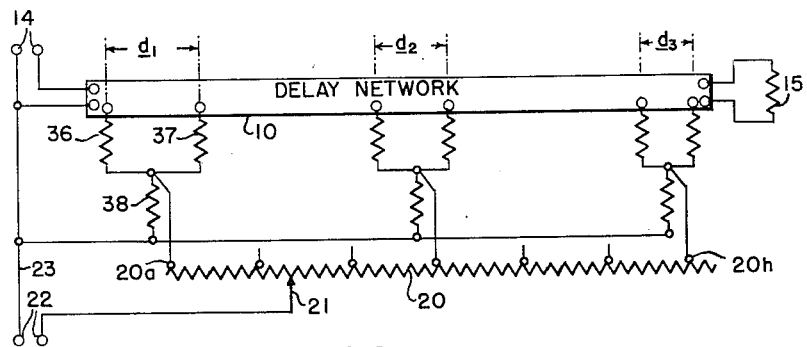
Figure 5:
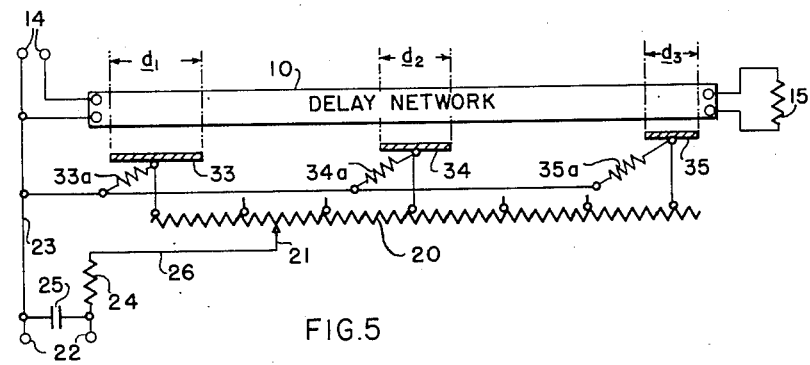

In the drawings, Fig. 1 is a schematic representation of a time-delay arrangement embodying the invention; Fig. 2 is a view partially in cross section representing constructional aspects of the arrangement of Fig. 1; Fig. 3 comprises graphs utilized in explaining the operation of the Fig. 1 arrangement; while Figs. 4, 5, and 6 are schematic representations of modified time-delay arrangements individually embodying the invention.

As previously indicated, the present invention is to be explained in connection with the continuously adjustable time-delay arrangement of copending application Serial No. 740,822, now abandoned, which is assigned to the same assignee as the instant one. Referring now more particularly to Fig. 1, the arrangement there represented is constructed in accordance with the invention in a manner to permit translating pulse signals of a predetermined slope time, to be explained hereinafter, with a preselected time delay. The arrangement comprises a time-delay network 10, shown schematically in Fig. 1, because it may take any of a variety of well-known forms, such as a wave guide, transmission line, coiled line or repeating lumped line. For the embodiment under consideration it will be assumed to be a coiled line of the unbalanced type. By way of example, as shown in Fig. 2, the time-delay network may include a longitudinally slotted core member 11 of conductive material and an elongated winding 12 wound over the core. While the core may have any of a variety of cross-sectional configurations, it will be assumed to be circular and the winding may be composed of an insulated conductor wound thereover. The insulation is effective to insulate the winding turns from the conductive core, while at the same time providing a distributed capacitance therebetween. This capacitance, in conjunction with the total inductance of the winding, determines the total available time delay of the network since in any such arrangement the total time delay available is directly related to the geometric mean of the total series inductance and total shunt capacitance.

The diameter and length of the core, the size and type of conductor utilized in fabricating the winding, the number and the pitch of the winding convolutions are selected in the usual manner to afford such values of inductance and capacitance that the network exhibits a preselected total time delay. In this connection, it will be apparent that an increase in the diameter or length of the core structure and winding results in higher values of inductance and capacitance, while increasing the permeability of the core or the number of turns per unit length of the winding increases primarily only the inductance.

The described network 10 is preferably enclosed by a nonconductive, sealed envelope 13 which may be constructed of glass. Sealing the network in this manner enhances its stability. A pair of conductors extend from one end of network 10, connecting the conductive core 11 and the first turn of winding 12 through appropriately sealed lead-in connections to a pair of terminals 14, 14. The other or far end of the network is terminated in a resistor 15, equal to the characteristic impedance of the network and providing a nonreflecting termination.

A plurality of coupling devices are spaced or distributed along the network with a uniform spacing between succeeding devices. For the embodiment under consideration, the coupling devices take the form of coupling coils. While it is contemplated that a large number may be associated with network 10, only three have been represented in the drawing and are designated 16, 17 and 18. The coils are wound over the external periphery of glass envelope 13 which supports the coils mechanically while permitting an electrical coupling to exist between the coils and the network. In accordance with the present invention, each of the pickup devices is graduated or proportioned to provide a coupling related to its distance from the input end of network 10 and the spacing of succeeding devices may be related to the slope time of the pulses for a purpose and in a manner to be made clear hereinafter.

The arrangement also includes an impedance, shown as a resistor 20, which has fixed taps uniformly distributed therealong for connection with the pickup coils. While for limited utility a single resistor may be utilized having only two taps to be selectively coupled with any pair of adjacent pickup coils and an adjustable tap slidable therebetween, it is preferred that a construction of the type indicated in the drawing be utilized. Specifically, resistor 20 in its preferred form is a composition or continuously wound wire resistor having a plurality of fixed taps which correspond in number with the plurality of coupling devices associated with network 10. The taps are designated 20a–20h, inclusive, and the appropriate ones are shown directly connected with one terminal of coils 16, 17 and 18. The leads extending from the remainder indicate connections from other pickup coils intended to be spaced along the network but omitted from the drawing for the sake of simplicity. The resistance presented between succeeding fixed taps of resistor 20 is high relative to the impedance of the coupling coils at the maximum frequency required to translate the applied pulse signals. Resistor 20 further includes an adjustable tap 21 which is movable therealong from one end to the other.

A conductor 26 connected to adjustable tap 21 and a second conductor 23 connected to the free ends of the pickup coils comprise means for completing or extending a signal-translating path from terminal pair 14, 14 at one end of network 10 to adjustable tap 21 of resistor 20, which path exhibits a time delay determined by the position of the adjustable tap. The described coupling coils, which may be selectively included in that path, cause distortion of pulse signals translated thereover. Specifically, the coils effect differentiation of such signals and for that reason a correcting or compensating network is associated with the path. In Fig. 1 the correction or compensation is afforded by an integrating network, provided by a series resistor 24 and shunt condenser 25, which connects conductors 23 and 26 to a second terminal pair 22, 22. If desired, a conductive shield 29 may be placed around network 10 and its pickup coils, shielding the major portion of the described signal path. Of course, where such a shield is utilized it is to have suitable apertures through which connections may be made to network 10 and the pickup coils, as indicated in Fig. 2.

In considering the operation of the described arrangement, reference is made to the curves of Fig. 3. Curve A shows the deterioration to which a pulse signal may be subjected in traversing network 10 from its near to its far end in view of the fact that networks of ordinary construction usually exhibit certain amounts of attenuation and slope reduction per unit length to applied pulses. The first pulse component $P_1$ represents the wave form of the applied pulse as it appears close to the input end of the network. The pulse has a large amplitude and a relatively narrow width or duration. The other component $P_2$ represents the wave form of that pulse as it appears in the vicinity of the far end of the network. The amplitude has been greatly diminished and the pulse has widened considerably. This change of pulse shape is inherent in practical time-delay constructions and reflects the influence of the attenuation and band width or pulse-slope reduction characteristics of the network. The attenuation of the direct-current component of the pulse is uniform and causes the amplitude to diminish progressively in traversing the network. The change of pulse width or slope results from the fact that the high-frequency attenuation is substantially greater than the low-frequency attenuation and the two effects, taken together, distort the applied signal, converting it from a strong narrow pulse at the input end of the network to a weak broad pulse at the opposite end. If pickup devices 16, 17 and 18 are identical, a corresponding change is manifested in the output signal obtained at terminals 22, 22. To avoid that result, each pickup coil may be graduated or proportioned to provide a coupling related to its distance from that end of network 10 which is supplied with terminals 14, 14 so that the signal path from that end of the network to each and every one of the pickup coils exhibits approximately the same total amount of attenuation and pulse-slope reduction.

In the embodiment of Fig. 1, this graduation is accomplished by proportioning the projected length of each coupling coil on network 10 and the number of turns included in each coil with reference to the slope reduction and attenuation characteristics, respectively, of the network. The lengths of the coils vary inversely with their distances from the input end of the network, while the number of turns included in each coil varies directly with this distance. Thus, the first coupling coil 16 has a length $d_1$ and may include a certain number of turns. Coil 17 has a smaller length $d_2$ and a greater number of turns, while coil 18 has a still smaller length $d_3$ and a still greater number of turns. The variation in coil length and number of turns is selected to have the signal path from the input end of the network to any of the coupling coils cause the same total amount of attenuation and pulse-slope reduction so that substantially identical pulses are translated between network 10 and each coupling device. A greater length of coupling coil has the unusual property of widening the pulse or decreasing its slopes; while a greater number of turns in this case has the obvious property of increasing the pulse amplitude. Therefore, with the described graduation of the pickup coils, the signals translated by all such coils have identical wave forms irrespective of the position of any coil along the network. This is indicated by curve B wherein the component $P_1'$ represents the output pulse which may be obtained near the input end of network 10 and the component $P_2'$ denotes the pulse output taken from the vicinity of the remote end of the network through pickup coils graduated in the described manner.

It is also preferable, for best operation and most economical construction, to have a particular spacing between succeeding coupling devices. This spacing should correspond to a delay in the network that is approximately equal to, being within the range from one-half to twice, the slope time of the pulses to be translated through the network and the coupling devices. Referring again to curve B, the pulse $P_1'$ has a slope time $t_1$ at its leading edge which may be defined as the time required for the pulse to vary most of the way between its minimum and maximum values. The component $P_3'$ represents the pulse obtained from the coupling device immediately adjacent to the one deriving the earlier component $P_1'$. These components have a relative displacement in time equal to $t_2$ and determined by the network portion from one such pickup device to the next. The time shift $t_2$ is preferably no greater than the slope time $t_1$ so that the successive pulses overlap in a substantial amount, as indicated in curve B. On the other hand, the economical compromise requires no more overlap than necessary to have the peak amplitude portions of succeeding pulses nearly contiguous because otherwise the arrangement includes an undesirably large number of coupling devices.

Having described the graduation of the coupling devices to cause the translation of identical pulses and having prescribed the appropriate spacing for succeeding coupling devices, the operation of the arrangement in translating pulse signals between terminal pairs 14, 14 and 22, 22 with a continuously adjustable time delay may be readily understood. Assume, initially, that pulses having a duration short with reference to the total delay between the end portions of time-delay network 10 are applied to terminal pair 14, 14. Also, assume that adjustable tap 21 has been moved along resistor 20 to fixed tap 20a, as shown in broken-line construction in Fig. 1. For the assumed conditions, the applied signal traverses time-delay network 10 and is picked up by the first coupling coil 16. The pulse induced in this coupling coil is distorted, being the time derivative of the pulse traversing the network, and the differentiated pulse is supplied from the terminals of coil 16, through fixed tap 20a and adjustable tap 21 of resistor 20, to the integrating network comprised of resistor 24 and condenser 25. Integration of the differentiated pulse compensates the differentiating effect of the coupling coil to supply to terminal pair 22, 22 an output pulse signal which has the same wave form as that inducing a signal in coupling coil 16. This output pulse may be considered to be the component $P_1'$ of curve B. Its delay with reference to the time of application of a pulse signal to input terminals 14, 14 is directly dependent upon the distance of coupling coil 16 from the input end of network 10.

Now, consider the tap 21 to be displaced along resistor 20 to the position of the next fixed tap 20b. With this adjustment, the coupling coil connected with fixed tap 20b derives a pulse from network 10 which, after integration by elements 24, 25, appears at terminal pair 22, 22, as indicated by component $P_3'$ of curve B. This output pulse has the same wave form as the first-mentioned output pulse $P_1'$. The time delay of the component $P_3'$, however, is increased by the time delay exhibited by the network portion intermediate the succeeding pickup devices. This delay determines the separation time $t_2$ of the components $P_1'$ and $P_3'$. Therefore, the displacement of adjustable tap 21 from fixed tap 20a to the next succeeding tap 20b increases the time delay in signal translation from terminal pair 14, 14 to terminal pair 22, 22 by the interval $t_2$. If adjustable tap 21 is positioned midway between fixed taps 20a and 20b, the pulse output delivered to terminals 22, 22 is contributed equally by the coupling devices connected with these fixed taps of resistor 20. In other words, for positions of the adjustable tap 21 intermediate a pair of adjacent fixed taps of the resistor, the signals presented at each of these fixed taps are mixed in all proportions, supplying to the terminal pair 22, 22 an output pulse. The output pulse has nearly the same amplitude and only slightly less slope for any intermediate position of the adjustable tap, and has a time delay determined by the position of that tap along resistor 20.

By displacing adjustable tap 21 to fixed tap 20h, a translated pulse experiences the maximum delay. Hence, the time delays available cover a wide range. One limit of this range corresponds with the time delay from terminal pair 14, 14 to the first fixed tap 20a of resistor 20 and the other limit represents the delay to the last fixed tap 20h. The intermediate values of time delay are determined by the location of adjustable tap 21 between these limits and the whole arrangement, therefore, exhibits a substantially continuously adjustable delay.

It is convenient to consider the fixed taps 20a—20h as representing fixed time delays which may be selected by positioning adjustable tap 21 at any of these fixed points. The resistor portion between succeeding ones of the fixed taps may be likened to a vernier adjustment for interpolating between the selectable, fixed time delays established by the fixed taps.

The arrangement of Fig. 4 is generally similar to that of Fig. 1 and corresponding components thereof are designated by the same reference characters. In this modification, however, shunt resistors 30, 31 and 32 are provided, each shunting one coupling coil. The shunt resistors are identical and represent a resistance that is small relative to the impedance of the coupling coils at the minimum frequency required to transmit the pulse signals. The coupling devices of this modification, being arranged in circuit with a low resistance, do not effect differentiation in deriving a pulse from the network 10. For this reason the integrating network 24, 25 of the Fig. 1 embodiment is not required. The lengths of the pickup coils are graduated in the manner of Fig. 1 to compensate the slope reduction characteristic of the network and the number of turns in the coils are proportioned to compensate the network attenuation, a greater number of turns in this case giving less amplitude. The spacing of succeeding coils is equal to or less than the pulse-slope duration. The modification operates to translate pulse signals with a continuously adjustable time delay in a manner generally similar to that described in the Fig. 1 arrangement. Structurally, the arrangement of Fig. 4 may be similar to that of Fig. 2.

In Fig. 5, capacitive coupling devices translate signals between terminal pairs 14, 14 and 22, 22. Each device includes an electrode which is spaced from a portion of the network to constitute therewith a coupling condenser, three electrodes 33, 34 and 35 being shown in the drawing. The electrodes may take the form of split rings or arcuate sectors of conductive material and the length of each as well as its coupling per unit length with the network, as determined by the electrode width or spacing from the network, is selected to enable all devices to translate substantially identical pulses. The length of each electrode varies inversely with its distance from the input end of the network while the coupling per unit of each with the network varies directly with this distance, the change in coupling being accomplished by having the radial or transverse separation between any electrode and the network inversely related to the distance from the input end. Resistors 33a, 34a, and 35a, having a small value relative to that presented between fixed taps of resistor 20, connect the corresponding electrodes to return conductor 23. Assuming the coupling devices to have a high impedance, their association with resistors 33a, 34a, etc., constitute differentiating circuits, the effects of which are compensated by the integrating network 24, 25 included in the connections from adjustable tap 21 to terminal pair 22, 22. The Fig. 5 arrangement may also be constructed as indicated in Fig. 2 with electrodes 33, 34, 35, etc., supported on the external periphery of envelope 13.

If desired, conductive connections instead of alternating-current couplings may associate time-delay network 10 with resistor 20. Thus, as represented in Fig. 6, one coupling device utilizes resistors 36 and 37 having one common terminal and having two other terminals which are conductively connected to network 10 and spaced to obtain a derived pulse from the network of a given width or duration. These resistors are connected with a third resistor 38 to define a three-terminal T-network of impedances in which element 38 is selected to determine the amplitude of the derived pulse. The junction of the resistors 36—37—38 is directly connected with tap 20a of resistor 20. Two other conductive-type coupling devices have been illustrated in Fig. 6, each comprising a similar combination of three resistors in a T-network having two terminals conductively connected with network 10 and having a common junction connected to a selected fixed tap of resistor 20. The spacing of the two terminals on network 10 in each case is varied to keep the same pulse width at each coupling device and the value of the attenuating resistor is selected to maintain constant amplitude for each derived pulse. In this way, each device translates a pulse with reference to network 10 that has a desired amplitude and wave form. The pulses supplied from the coupling devices to resistor 20 may be taken off by adjustable tap 21 for application to terminal pair 22, 22 with a selected time delay.

In the foregoing description, the desired proportioning has been recited for each of several different types of pickup devices to assure a substantially uniform pulse output irrespective of the time delay obtained. Viewed in a generic sense each coupling device has one parameter, determining the amplitude of the pulses translated thereby, proportioned relative to the distance of that device from one end of network 10 so that the signal path from that end to any device causes approximately the same total attenuation to applied pulses. In the case of inductive pickups this parameter is the number of turns, while for capacitive pickups it is the coupling area or coupling per unit length with the network. Each device has another parameter, determining the slope of pulses translated thereby, also proportioned relative to its distance from the same end of the network so that the signal path from that end to every one of the devices causes approximately the same total amount of slope reduction to applied pulses. This other parameter for any type of pickup is the projected length of the coupling device upon the network.

Each of the illustrated embodiments of the invention has been described as translating a signal pulse from the input end of time-delay network 10 to a pair of output terminals associated with an adjustable tap of a resistor connected with a plurality of coupling devices. It will be understood, of course, that signal translation can take place in the opposite direction, utilizing the terminal pair connected with the slidable tap as the input and the terminal pair connected with the time-delay network as the output. Each embodiment has the advantage of providing a time delay which is continuously or closely adjustable over a wide range of values and, in every case, the output pulse has substantially a constant width and amplitude irrespective of the selected time delay.

While there have been described which are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for translating pulse signals of a predetermined slope with a selectable time delay comprising: a time-delay network exhibiting given amounts of attenuation and slope reduction per unit length to such pulses; and a plurality of coupling devices distributed along said network and individually having one parameter, determining the amplitude of pulses translated thereby, proportioned relative to the distance of the coupling device from one end of the network, and having another parameter, determining the slope of such pulses, also proportioned relative to said distance, so that the signal path from said one end to every one of said devices causes approximately the same total attenuation and slope reduction to applied pulses.

2. An arrangement for translating pulse signals of a predetermined slope with a selectable time delay comprising: a time-delay network exhibiting a given amount of attenuation per unit length to such pulses; and a plurality of coupling coils distributed along said network and individually including a number of turns which varies with the distance of each such coil from one end of the network so that the signal path from said one end to every one of said coils causes approximately the same total attenuation to applied pulses.

3. An arrangement for translating pulse signals of a predetermined slope with a selectable time delay comprising: a time-delay network exhibiting a given amount of attenuation per unit length to such pulses; and a plurality of coupling coils distributed along said network and individually including a number of turns which increases with the distance of each such coil from one end of the network so that the signal path from said one end to every one of said coils causes approximately the same total attenuation to applied pulses.

4. An arrangement for translating pulse signals of a predetermined slope with a selectable time delay comprising: a time-delay network exhibiting a given amount of slope reduction per unit length to such pulses; and a plurality of coupling coils distributed along said network and individually proportioned to have a projected length on said network that decreases with increasing distance of each such coil from one end of the network so that the signal path from said one end to every one of said coils causes approximately the same total slope reduction to applied pulses.

5. An arrangement for translating pulse signals of a predetermined slope with a selectable time delay comprising: a time-delay network including an elongated coil and exhibiting given amounts of attenuation and slope reduction per unit length to such pulses; and a plurality of coupling coils distributed along said elongated coil and individually having a projected length on said elongated coil varying inversely with the distance of each coil from one end of said network and including a number of turns varying directly with its distance from said one end so that the signal path from said one end to every one of said coupling coils causes approximately the same total attenuation and slope reduction to applied pulses.

6. An arrangement for translating pulse signals of a predetermined slope with a selectable time delay comprising: a time-delay network exhibiting a given amount of attenuation and slope reduction per unit length to said pulses; and a plurality of electrodes distributed along said network to constitute capacitive coupling devices and having a coupling per unit length with said network that varies directly with the distance to each of said electrodes from one end of said network and determines the amplitude of the pulses translated thereby, and having a parameter, determining the slope of such pulses, proportioned relative to the distance of each of said electrodes from said one end of the network, so that the signal path from said one end to every one of said devices causes approximately the same total amount of attenuation and slope reduction to applied pulses.

7. An arrangement for translating pulse signals of a predetermined slope with a selectable time delay comprising: a time-delay network including an elongated coil and exhibiting a given amount of attenuation and slope reduction per unit length to said pulses; and a plurality of electrodes distributed along said network to constitute capacitive coupling devices and having a transverse spacing from said coil that varies inversely with the distance to each of said electrodes from one end of said network and determines the amplitude of the pulses translated thereby, and having a parameter, determining the slope of such pulses, proportioned relative to the distance of each of said electrodes from said one end of the network, so that the signal path from said one end to every one of said devices causes approximately the same total amount of attenuation and slope reduction to applied pulses.

8. An arrangement for translating pulse signals of a predetermined slope with a selectable time delay comprising: a time-delay network exhibiting a given amount of slope reduction and attenuation per unit length to said pulses; and a plurality of electrodes distributed along said network to constitute capacitive coupling devices and having a projected length on said network that varies inversely with the distance to each of said electrodes from one end of said network and determines the slope of the pulses translated thereby, and having a parameter, proportioned relative to the distance of each of said electrodes from said one end of said network, so that the signal path from said one end to every one of said devices causes approximately the same total amount of slope reduction and attenuation to applied pulses.

9. An arrangement for translating pulse signals of a predetermined slope with a selectable time delay comprising: a time-delay network exhibiting given amounts of attenuation and slope reduction per unit length to such pulses; and a plurality of capacitive coupling devices distributed along said network and individually having one parameter, determining the amplitude of pulses translated thereby, proportioned relative to the distance of the coupling device from one end of the network and having another parameter, determining the slope of such pulses, also proportioned relative to said distance so that the signal path from said one end to every one of said devices causes approximately the same total attenuation and slope reduction to applied pulses.

10. An arrangement for translating pulse signals of a predetermined slope with a selectable time delay comprising: a time-delay network exhibiting given amounts of attenuation and slope reduction per unit length to such pulses; and a plurality of coupling devices distributed along said network individually including a three-terminal T-network of impedances having two terminals conductively connected to said time-delay network with a separation proportioned relative to the distance of the coupling device from one end of the network and having a value of impedance also proportioned relative to said distance so that the signal path from said one end to every one of said devices causes approximately the same total attenuation and slope reduction to applied pulses.

HAROLD A. WHEELER.

REFERENCES CITED

The following references are of record in the file of this patent:

UNITED STATES PATENTS

| Number | Name | Date |
|---|---|---|
| 2,227,052 | White | Dec. 31, 1940 |
| 2,251,973 | Bealg et al. | Aug. 12, 1941 |
| 2,263,376 | Blumlein et al. | Nov. 18, 1941 |
| 2,382,413 | Hanert | Aug. 14, 1945 |

FOREIGN PATENTS

| Number | Country | Date |
|---|---|---|
| 565,669 | Germany | Dec. 5, 1932 |
| 466,092 | Great Britain | May 21, 1937 |